(12) United States Patent
Welfare

(10) Patent No.: US 6,588,455 B1
(45) Date of Patent: Jul. 8, 2003

(54) METHOD AND APPARATUS FOR BLOCKING PIPES

(75) Inventor: Andrew Welfare, Padiham (GB)

(73) Assignee: Glynwed Pipe Systems, Ltd., Keighley (GB)

( * ) Notice: Subject to any disclaimer, the term of this patent is extended or adjusted under 35 U.S.C. 154(b) by 0 days.

(21) Appl. No.: 10/089,655

(22) PCT Filed: Oct. 2, 2000

(86) PCT No.: PCT/GB00/03771
§ 371 (c)(1),
(2), (4) Date: Jul. 8, 2002

(87) PCT Pub. No.: WO01/25676
PCT Pub. Date: Apr. 12, 2001

(30) Foreign Application Priority Data

Oct. 2, 1999 (GB) .............................................. 9923263

(51) Int. Cl.$^7$ ................................................ F16L 55/10
(52) U.S. Cl. ...................... 138/94.5; 138/94; 138/93; 137/318
(58) Field of Search ........................ 138/94, 94.3, 94.5, 138/93; 137/317, 318

(56) References Cited

U.S. PATENT DOCUMENTS

| | | | | |
|---|---|---|---|---|
| 2,476,907 A | * | 7/1949 | Preston et al. ................. | 138/94 |
| 2,482,696 A | | 9/1949 | Smith et al. ................... | 138/94 |
| 3,115,163 A | | 12/1963 | Van Epps ..................... | 138/94 |
| 4,458,721 A | * | 7/1984 | Yie et al. ....................... | 138/93 |
| 4,627,470 A | * | 12/1986 | Carruthers .................... | 138/93 |
| 5,524,661 A | * | 6/1996 | Tigerholm ................ | 137/15.15 |
| 5,778,919 A | * | 7/1998 | Petrone ................... | 137/15.08 |

FOREIGN PATENT DOCUMENTS

| | | | | |
|---|---|---|---|---|
| EP | 0027027 A | | 4/1981 | |
| GB | 1311017 | * | 3/1973 | ................. 138/94 |
| GB | 2204660 A | | 11/1988 | |

* cited by examiner

*Primary Examiner*—Patrick Brinson
(74) *Attorney, Agent, or Firm*—Akin Gump Strauss Hauer & Feld, LLP

(57) ABSTRACT

Apparatus for blocking the bore of a pipe (1) comprises a plurality of elongate shutter member (15–17) pivotably mounted to an elongate support member (3/3a) for insertion through a pre-drilled aperture (8) in the pipe wall. Actuating means (14) are provided for pivoting the shutter members (15–17) from an insertion configuration in which they substantially aligned with said support member (3a) and deployed configuration in which they are fanned out across the bore of the pipe (1). Each shutter member (15–17) is pivoted about a point (9) located towards one end thereof and towards the insertion end of the support member (3a) so as in use to lie between the axis of the bore of the pipe and the wall of the pipe (1) opposite the location of said aperture.

34 Claims, 1 Drawing Sheet

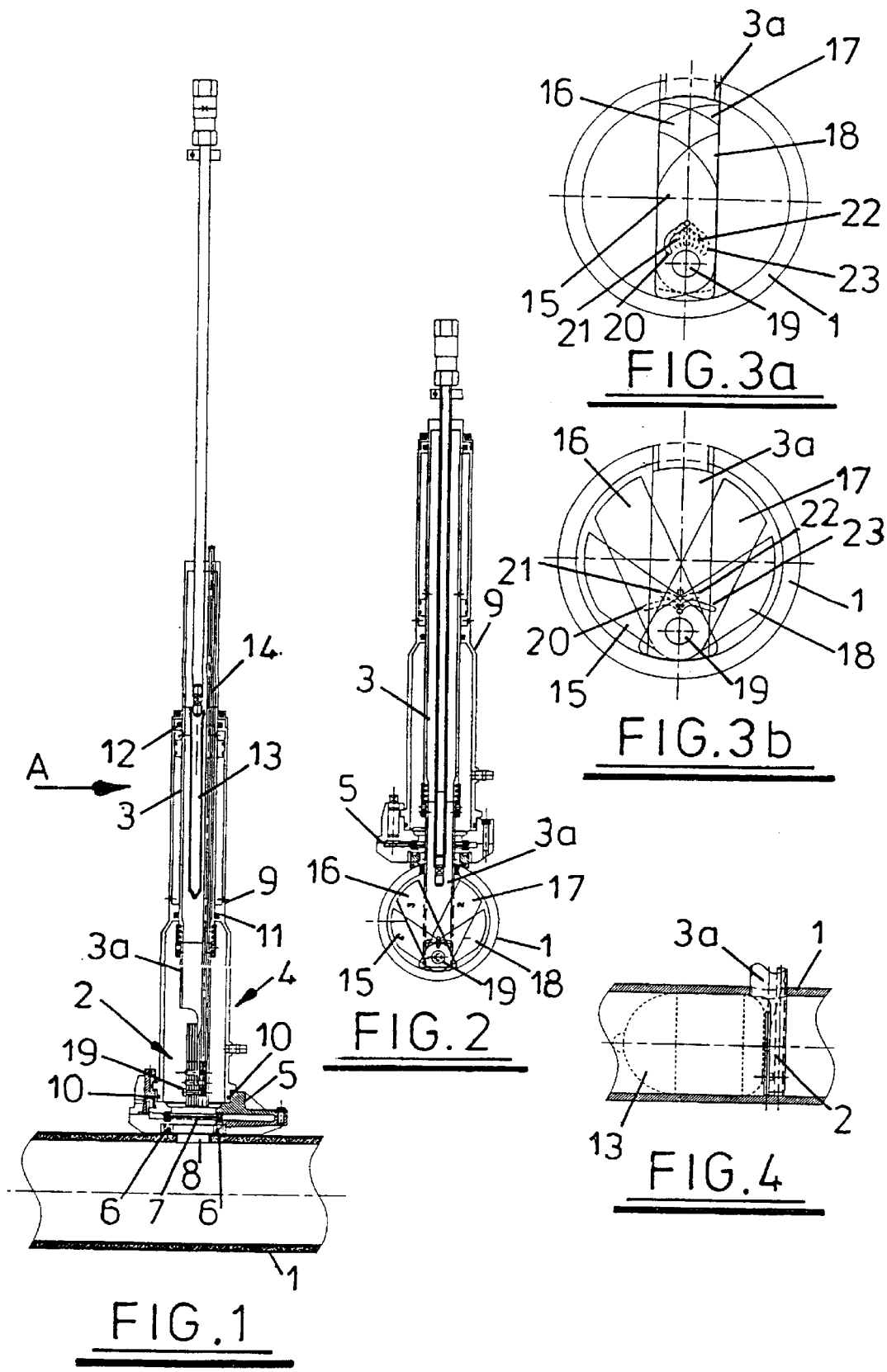

METHOD AND APPARATUS FOR BLOCKING PIPES

The present invention relates to a method and apparatus for blocking the bore of a fluid conduit. Particularly, but not exclusively, the invention provides a method and apparatus for temporarily blocking the bore of a pipe such as, for instance, a gas or water mains pipe.

A variety of different methods are known for temporarily stopping flow through an in service pipe to enable maintenance work to be carried out on a particular section of pipe without removing the whole pipe from service. Most are designed to be inserted through one or more holes drilled in the pipe wall using well known drilling apparatus designed for operation under pressure. For instance, within the gas industry inflatable stopping bags are widely used. Such bags are designed to be inserted (in a deflated state) through a hole drilled in the pipe wall and then subsequently inflated to form a sealed blockage in the pipe.

Whilst simple stopping bag devices are suitable for use in relatively low pressure applications, such as in low pressure gas pipes, they are less suitable for higher pressure situations in which the bag might tend to be pushed along the length of the pipe. British patent number 1311017 discloses an apparatus which enables stopping bags to be used in relatively high pressure gas pipes and which has since become well established. Essentially, a mechanical support is inserted into the pipe to support the inflatable bag in position. The mechanical support is an iris structure which is inserted through a hole drilled in the pipe prior to insertion and inflation of the stopping bag. The iris comprises a number of slats (of a length marginally shorter than the bore of the pipe) which are centrally pivoted on a support rod. The slats are initially aligned with one another and with the support member so that the iris mechanism can be inserted through a relatively small hole in the pipe wall. Once in position in the pipe (with the pivot axis of the slats coinciding with the central axis of the pipe bore) the slats are rotated into an open configuration effectively forming a disk extending across the bore of the pipe. Once the iris is opened in position a stopping bag is inserted through a second hole drilled in the pipe and inflated in position adjacent the iris.

Although bagging off systems are widely used in the gas industry this technology has yet to be successfully used in, for instance, the water industry. One reason for this is that the relatively high density and pressure of water within water mains exerts much higher mechanical forces which can push the bag along the pipe and thereby damage the bag. Moreover, tests on the iris structure described above have shown that this is not particularly suitable for use in water mains for a number of reasons. Firstly, to strengthen the known iris structure sufficiently to withstand the increased forces (for instance by thickening the slats) necessarily increases the bulk of the device with a corresponding increase in the size of the hole which must be drilled in the pipe wall for insertion of the iris. This can greatly increase the complexity and cost of the equipment needed both to drill the hole and to seal the hole again when the maintenance work has been completed.

Secondly, whereas the bore of a typical gas main is generally relatively clean, the bore of a water pipe will typically suffer tuberculation in which thick deposits of calcium and iron salts adhere to the wall of the pipe. These deposits can inhibit rotation of the iris slats thereby preventing the iris from fully opening. With the known iris mechanism the various slats are interconnected (a pin of one slat locating in a slot of an adjacent slat) and only one of the slats is positively rotated by the installation apparatus (via a bevel gear arrangement). The iris is designed so that after the first slat is rotated through a given angle, further rotation will cause it to drag the second slat with it. Once the second slat has rotated through a given angle its further rotation will then drag the third slat with it and so on. Thus, if the first slat is prevented from rotating the second and subsequent slats will also be prevented form rotating. Even if it is possible to fully open the iris, the presence of dirt and turberculation may damage or distort the slats thereby preventing them from being rotated into the closed position and removed from the pipe after use. This would then necessitate a section of pipe being replaced entirely.

Thirdly, although British patent number 1311017 suggests that the iris mechanism and subsequent stopping bag may be inserted through a single hole drilled in the pipe, the preferred arrangement (which is the practical arrangement in fact used) is to insert the bag through a separate hole thus requiring two holes to be drilled in the pipe wall. The second hole is needed because the bulk of the iris mechanism, including the bevel gear arrangement required to rotate the iris slats, provides an obstacle to insertion of the stopping bag once the iris is in position and thus to avoid drilling an unacceptably large hole a second hole must be drilled for insertion of the bag.

Systems conventionally used in the water industry (and other industries such as the oil industry) tend to comprise rigid disks, or deformable rubber bungs, which as stoppers are inserted through a hole drilled in the wall of the pipe. A disadvantage of these systems is that in view of the size of the disk/bung etc, the hole required in the pipe must generally be substantially equal to the diameter of the bore of the pipe. Equipment associated with the drilling of such a large hole, inserting the stopper and then closing the aperture once the maintenance operation etc is complete, is relatively heavy and expensive (bearing in mind that the drilling of all these operations must be performed under pressure). In addition, existing systems tend to require valuable equipment to remain permanently installed on the pipe once the maintenance operation is complete.

It is an object of the present invention to obviate or mitigate the disadvantages mentioned above.

According to a first aspect of the present invention there is provided apparatus for blocking the bore of a pipe through which fluid flows, the apparatus comprising at least four elongate shutter members pivotably mounted to an elongate support member for insertion through a pre-drilled aperture in the pipe wall, actuating means for pivoting said shutter members from an insertion configuration in which they are substantially aligned with said support member and a deployed configuration in which they are fanned out across the bore of the pipe to at least partially block said bore, wherein each shutter member is pivoted about a point located towards one end thereof and towards the insertion end of the support member so as in use to lie between the axis of the bore of the pipe and the wall of the pipe opposite the location of said aperture.

Positioning of the pivot point of the shutter members both towards one end thereof and towards the insertion end of the support member (i.e. the end of the support member that is inserted through the aperture in the pipe) provides a number of advantages over the prior art which will be apparent from the following description. In particular, this design enables the construction of apparatus which can withstand the relatively large mechanical force as encountered in pipes in which the fluid is a liquid, such as water, without being particularly bulky thereby minimising the size of the hole required for insertion of the apparatus. In addition, construction of the device in accordance with the present invention leaves the aperture in the pipe substantially unobstructed so that the same aperture may be used for subsequent insertion of an inflatable stopping bag or the like. Apparatus according to the present invention is therefore particularly suited, although not limited, to use in industries such as the water industry in conjunction with essentially conventional stopping bag arrangements for temporarily blocking the flow of water through a section of pipe.

The invention further provides a method of blocking the bore of a pipe comprising drilling an aperture in the wall of the pipe, deploying apparatus as outlined above within the bore the pipe accessed via said aperture, and subsequently inserting an inflatable bladder through the same aperture and inflating the bladder to form a blockage in the pipe adjacent to, and supported by, the assembly of shutter members.

As indicated above, the apparatus in accordance with the present invention enables apparatus including an inflatable stopping bag to be inserted through a single relatively small diameter aperture drilled in the pipe wall. Thus, according to a further aspect of the present invention there is provided a method of blocking the bore of a pipe through which fluid flows, comprising forming an aperture in the wall of the pipe, inserting through said aperture a support device comprising a plurality of shutter members which are movable with respect to each other from aligned positions in which they are inserted through the aperture into deployed positions in which they are laterally offset from each other to form a support across the bore of the pipe, subsequently inserting through the same aperture an expandable sealing member in an initial unexpanded configuration and then expanding the sealing member to form a sealed blockage within the pipe adjacent said support device, wherein said aperture is substantially circular and no greater than approximately ¼ of the diameter of the bore of the pipe.

Although the prior art mentioned above suggests the possibility of the iris assembly and subsequent stopping bag being inserted through a common hole, this is not the preferred arrangement. The difficulty with that prior art device is that its relative bulk, and the position of the pivot and actuating mechanism, prevent the stopping bag from being inserted through the same hole unless the hole is elongated or has a diameter substantially bigger than a ¼ diameter of the pipe, both of which would be undesirable.

The present invention further provides apparatus for blocking the bore of a pipe through which fluid flows, the apparatus comprising a shutter assembly comprising at least four shutter members mounted to an elongate support member for insertion through a pre-drilled aperture in the pipe wall, the shutter members being moveable from a first position in which they are substantially aligned with the support member for insertion through said aperture and a second position in which they are displaced from one another forming a barrier across the bore of the pipe, wherein the shutter members are interconnected by a web which prevents a gap forming between adjacent to shutter members.

A specific embodiment of the present invention will now be described, by way of example only, with reference to the accompanying drawings, in which:

FIG. 1 is a sectional view of apparatus according to the present invention mounted to a pipe prior to installation;

FIG. 2 is a sectional view of the apparatus of FIG. 1 in the direction of arrow A of FIG. 1 subsequent to installation;

FIGS. 3a and 3b are enlarged illustrations of part of the apparatus of FIGS. 1 and 2 showing two stages of the installation process; and FIG. 4 illustrates operation of the apparatus in use as a support for an inflatable stopping bag.

Referring to the drawings, the illustrated apparatus in accordance with the present invention is shown mounted to a water mains pipe 1 and comprises a stopping bag support device 2 mounted at the end of a post 3a which is an extension of a stopping bag insertion tube 3 which is itself mounted within a conventional machine assembly 4 designed for the performance of various operations on a pressurised water mains pipe. The machine assembly 4 comprises a machine base 5 which may be secured to the pipe 1 by a chain or the like (not shown) and sealed with respect to the pipe by an annular sealing member 6. The machine base 5 houses a sliding plate valve 7 shown in FIG. 1 in a closed position. The base 5 is of a universal nature providing a platform to which different machines can be mounted to perform operations on the pipe 1. For instance, as shown in FIG. 1 a hole 8 has previously been drilled in the pipe using conventional drilling apparatus (not shown) mounted to the base 5 and then subsequently removed and replaced with the apparatus illustrated. The valve 7 is provided to seal the hole 8 in the pipe 1 as the drilling machine etc is removed and replaced.

Mounted to the machine base 5 is an inflatable stopping bag insertion assembly incorporating the stopping bag support device 2 in accordance with the present invention. The bag insertion assembly comprises a conventional outer housing 9 which is sealed with respect to the base 5 by an annular sealing member 10. The housing 9 supports the bag insertion tube 3/3a which is sealed with respect to the housing 9 by annular sealing members 11 and 12. The bag insertion tube 3 in turn supports a bag insertion tool 13a which has a bag (at this stage not inflated) 13 fixed to its lower end (indicated only schematically in the figures). The insertion tube 3/3a further carries the support device 2 and an associated actuating rod 14.

The support device 2 comprises four slats, numbered 15, 16, 17 and 18 respectively, each pivotably secured to the bag insertion tube extension 3a about a common pivot 19 located at the lower end of the post 3a. The slats 15, 16, 17 and 18 are generally rectangular of the same width as the tube extension 3a, but have arcuately profiled end edges to conform with the curvature of the bore of the pipe (see FIGS. 2 and 3).

The actuating rod 14 has at its lower end an actuating pin which travels in curved slots 20–23 provided in each of the slats 15–18 respectively. It will be seen that the two slats 15 and 18 are mirror images of one another, as are the respective slats 20 and 23. Similarly, the slots 16 and 17, and respective slots 21 and 22 are mirror images of one another.

In operation, the assembly is initially mounted to the machine base 5 (subsequent to drilling of the hole 8) as illustrated in FIG. 1. The valve 7 is then opened and the bag insertion tube 3/3a carrying the support device 2 is lowered through the hole 8 and into the pipe 1 until it contacts the bottom of the pipe. At this stage the slats will be in a closed position in which they are aligned with the extension 3a of the insertion tube 3 as illustrated in FIG. 3a. The actuation rod 14 is then pushed downwards relative to the tube 3/3a thereby driving the actuating pin vertically within the slots 20 to 23. The curvature of the slots 20–23 is designed so that as the pin moves vertically (travelling within the slots), the slats 15–16 are caused to rotate about the pivot 19 and thereby fan out into an open configuration as illustrated in FIGS. 2 and 3b. In this configuration the ends of each slat remote from the pivot 19 bear against the internal wall of the pipe 1 so that the slats 15–18, together with the post 3a of the insertion tube 3, form a blockage across the bore of the pipe. The opening movement of the slats is to some extent aided by the profile of their lower edges and the pressure exerted on those lower edges as the device 2 bears against the bottom of the pipe 1. That is, the downward force exerted by the tube 3/3a exerts a turning moment about the point of contact between the slats 15–18 and the pipe wall tending to bias the slats towards the open position.

Once the device 2 has deployed within the pipe, the bag insertion tool 13 can then be lowered into the position illustrated in FIG. 2 to insert the bag 13a through the hole 7 (the bag 13 is not illustrated in FIG. 2 to avoid obscuring details of the device 2). It will be appreciated that there is no need to make any changes to the machinery mounted to the base 5 to insert the bag 13. Once in position in the pipe the bag can be inflated using conventional means (not shown). Once inflated the bag forms a sealed blockage within the bore of the pipe 1 and is supported by the support device 2, as illustrated in FIG. 4.

Removal of the bag may be performed in a conventional way and removal of the support device 2 is simply the reverse of the procedure described above. Once the apparatus has been removed the single and relatively small hole 8 can be readily sealed in any conventional way.

The structure of the support device 2 of the present invention has a number of advantages over the iris structure discussed in the introduction to this specification. For instance, the device, and in particular the actuating mechanism, is less bulky than that of the prior art allowing it to be inserted through a relatively small hole on the end of a modified bag insertion tube. Pivoting the slats about one end, rather than about the middle, ensures that the ends of the slats which are brought to bear against the pipe wall approached the pipe wall substantially normally, i.e. the slats do not have to sweep across the inside of the pipe wall and are therefore not as vulnerable to the presence of obstructions on the pipe wall as the prior art device. If any obstructions do prevent full opening of the slats, the device can be partially opened without damage and still provide a safe and effective support. Location of the pivot and actuating mechanism at the end of the slats remote from the hole in the pipe ensures that the hole is substantially unobstructed when the support device is deployed so that the bag can be inserted through the same hole. This both avoids the need to drill a separate hole for bag insertion, and also enables the size of the single hole to be minimised.

It will be appreciated that many modifications may be made to the details of the apparatus described above. For instance, to further ease the opening operation of the slats, small wheels could be mounted to the ends of the slats which bear against the bottom of the pipe to aid turning of the slats about pivot 19. The actuating rod may be spring assisted in either direction and may be lockable in either of the open and closed positions. Movement of the actuating rod (and also the tube and post 3/3a) may be manual or may be power assisted, e.g. by a hydraulic system. Suitable hydraulic systems using the pressurised fluid from the pipe are well known.

Other possible actuating mechanisms might be used in place of the pin/slot arrangement illustrated. For example, the slats could be interconnected by a series of suitably pivoted and configured interlinking arms. Similarly, the number and design of the slats may vary considerably. The bag insertion tube 3a may not be inserted centrally within the pipe but may, for instance, be offset to one side in which case the length and shape of the slats will need to be designed appropriately.

As a further modification some form of webbing, such as a rubber or similar flexible sheet, may be included to interconnected the slats to close the gaps therebetween (when in the open position) thereby further obstructing flow through the pipe. Such a modified device may be sufficient to obviate the need for a stopping bag or similar device in some applications. It will be appreciated that the idea of providing the webbing could be applied to other structures, including the known iris structure discussed in the introduction to this specification.

To help improve the stability and structural rigidity of the once deployed a spike or similar means may be provided at the lower end of the post 3a to engage the pipe wall both to help prevent the device from being pushed along the pipe and to prevent the post 3a or slats from bending which might otherwise inhibit opening or closing of the slats.

What is claimed is:

1. A method of blocking the bore of a pipe through which fluid flows, comprising:

drilling an aperture in the wall of the pipe and inserting therethrough apparatus comprising a plurality of elongate shutter members pivotably mounted to an elongate support member, actuating means for pivoting said shutter members from an insertion configuration in which they are substantially aligned with said support member and a deployed configuration in which they are fanned out across the bore of the pipe to at least partially block said bore, wherein each shutter member is pivoted about a point located towards one end thereof and towards the insertion end of the support member so as in use to lie between the axis of the bore of the pipe and the wall of the pipe opposite the location of said aperture;

deploying said apparatus in the bore of the pipe; and inserting an inflatable bladder through said aperture in the bore of the pipe following deployment of said apparatus, and subsequently inflating said bladder to form a blockage in the pipe adjacent to, and supported by, said apparatus.

2. Apparatus for blocking the bore of a pipe through which fluid flows, the apparatus comprising at least four elongate shutter members pivotably mounted to an elongate support member for insertion through a pre-drilled aperture in the pipe wall, actuating means for pivoting said shutter members from an insertion configuration in which they are substantially aligned with said support member and a deployed configuration in which they are fanned out across the bore of the pipe to at least partially block said bore, wherein each shutter member is pivoted about a point located towards one end thereof and towards the insertion end of the support member so as in use to lie between the axis of the bore of the pipe and the wall of the pipe opposite the location of said aperture.

3. Apparatus according to claim 2, wherein the or each pivot point is located adjacent said end of the respective shutter member and adjacent the insertion end of the support member.

4. Apparatus according to claim 2, wherein the insertion end of the support member in use bears against the wall of the pipe opposite said aperture.

5. Apparatus according to claim 2, wherein an end of at least one of said shutter members towards which the pivot is located is adapted to bear against the wall of the conduit opposite the aperture.

6. Apparatus according to claim 5, wherein said end of said at least one shutter member is profiled such that pressure exerted by the member on the pipe wall produces a turning moment which tends to bias the shutter member towards its deployed configuration.

7. Apparatus according to claim 2, wherein all of the shutter members are pivoted about a common pivot.

8. Apparatus according to claim 2, wherein the assembly of shutter members comprises shutter members of differing lengths, the length of the shutter members being such that with the shutter assembly fully deployed ends of each shutter member remote from said pivot will bear against the wall of the pipe.

9. Apparatus according to claim 2, wherein the shutter members are shaped, and the pivot point located, such that as the shutter members fan out into the deployed configuration the end of each shutter member remote from said pivot approaches the pipe wall substantially normally.

10. Apparatus according to claim 2, wherein a flexible web extends between each of the shutter members to prevent a gap forming between adjacent shutting members when in the deployed configuration.

11. Apparatus according to claim 2, wherein the actuating means acts on the shutter members in a region adjacent said pivot point and towards said insertion end of the support member.

12. Apparatus according to claim 11, wherein the actuating means comprises an elongate actuating member which in use extends through said aperture in the pipe allowing remote operation of the shutter assembly.

13. Apparatus according to claim 12, wherein the actuating means comprises a mechanism for converting transitional and/or rotational movement of the actuating member into movement of the shutter members, said mechanism being located adjacent said pivot point towards said insertion end of the support member.

14. Apparatus according to claim 13, wherein said mechanism comprises an actuating pin carried by the actuating member which travels in slots defined in each of said shutter members, the slots being profiled such that vertical movement of the actuating member and actuating pin exerts a turning moment on each of the shutter members causing the shutter members to move from said insertion to said deployed configuration and vice versa.

15. Apparatus according to claim 2, wherein said support member is an extension of a tubular member provided for insertion of an inflatable bladder through said aperture once said shutter assembly is deployed.

16. Apparatus according to claim 15, wherein the actuating means comprises an elongate actuating member which extends through said tubular member.

17. Apparatus for blocking the bore of a pipe through which fluid flows, the apparatus comprising a shutter assembly comprising at least four shutter members mounted to an elongate support member for insertion through a pre-drilled aperture in the pipe wall, the shutter members being moveable from a first position in which they are substantially aligned with the support member for insertion through said aperture and a second position in which they are displaced from one another forming a barrier across the bore of the pipe, wherein the shutter members are interconnected by a web which prevents a gap forming between adjacent to shutter members.

18. Apparatus according to claim 17, wherein the shutter members are substantially elongate members pivotably mounted on said support member such that the shutter members fan out about said pivot axis when moving from said insertion to said deployed configurations.

19. Apparatus according claim 17, wherein said web is formed from a flexible material which stretches as said shutter members move from the first position to the second position.

20. Apparatus according to claim 17, wherein said web is made from a flexible material which unfolds and folds as the shutter members are moved between the first and second positions.

21. The method of claim 1, wherein the plurality of elongate shutter members comprises at least four shutter members.

22. The method of claim 1, wherein the or each pivot point is located adjacent said end of the respective shutter member and adjacent the insertion end of the support member.

23. The method of claim 1, wherein drilling an aperture and inserting therethrough the apparatus comprises:
positioning the insertion end of the support member to bear against the wall of the pipe opposite the aperture.

24. The method of claim 1, wherein drilling an aperture and inserting therethrough the apparatus comprises:
positioning an end of at least one shutter member towards which the pivot is located such that it bears against the wall of the pipe opposite the aperture.

25. The method of claim 24, wherein drilling an aperture and inserting therethrough the apparatus comprises:
biasing at least one shutter member towards its deployed configuration.

26. The method of claim 1, wherein all of the shutter members are pivoted about a common pivot.

27. The method of claim 1, wherein deploying said apparatus in the bore of the pipe comprises:
positioning the fully deployed assembly of shutter members such that ends of each shutter member remote from said pivot bear against the wall of the pipe.

28. The method of claim 1, wherein deploying said apparatus in the bore of the pipe comprises:
positioning the deployed assembly of shutter members such that the end of each shutter member remote from the pivot approaches the pipe wall substantially normally.

29. The method of claim 1, wherein deploying said apparatus in the bore of the pipe comprises:
extending a flexible web between each of the shutter members, preventing a gap forming between adjacent shutter members when deployed.

30. The method of claim 1, wherein the actuating means acts on the shutter members in a region adjacent said pivot point and towards said insertion end of the support member.

31. The method of claim 30, wherein the actuating means comprises an elongate actuating member which in use extends through said aperture in the pipe allowing remote operation of the shutter assembly.

32. The method of claim 31, wherein said mechanism comprises an actuating pin carried by the actuating member which travels in slots defined in each of said shutter members, the slots being profiled such that vertical movement of the actuating member and actuating pin exerts a turning moment on each of the shutter members causing the shutter members to move from said insertion to said deployed configuration and vice versa.

33. The method of claim 1, wherein the support member is an extension of a tubular member provided for inserting the inflatable bladder through the aperture.

34. The method of claim 1, wherein the actuating means comprises:
an elongate actuating member that extends through said tubular member.

* * * * *